(12) United States Patent
Gupta et al.

(10) Patent No.: US 7,370,022 B2
(45) Date of Patent: May 6, 2008

(54) BUILDING PLANS FOR HOUSEHOLD TASKS FROM DISTRIBUTED KNOWLEDGE

(75) Inventors: Rakesh Gupta, Mountain View, CA (US); Chirag Shah, Amherst, MA (US)

(73) Assignee: Honda Motor Co., Tokyo (JP)

( * ) Notice: Subject to any disclaimer, the term of this patent is extended or adjusted under 35 U.S.C. 154(b) by 0 days.

(21) Appl. No.: 11/296,020

(22) Filed: Dec. 6, 2005

(65) Prior Publication Data

US 2007/0022073 A1   Jan. 25, 2007

Related U.S. Application Data

(60) Provisional application No. 60/697,843, filed on Jul. 8, 2005.

(51) Int. Cl.
*G06F 17/00* (2006.01)
(52) U.S. Cl. .............. 706/45; 706/15; 706/25; 707/6
(58) Field of Classification Search ............. 700/264; 701/23; 706/12, 25
See application file for complete search history.

(56) References Cited

U.S. PATENT DOCUMENTS

| | | | |
|---|---|---|---|
| 4,638,445 A * | 1/1987 | Mattaboni | 701/23 |
| 4,884,217 A | 11/1989 | Skeirik et al. | |
| 5,392,382 A | 2/1995 | Schoppers | |
| 5,717,598 A | 2/1998 | Miyakawa et al. | |
| 5,774,632 A * | 6/1998 | Kaske | 706/25 |
| 5,889,926 A | 3/1999 | Bourne et al. | |
| 6,135,396 A | 10/2000 | Whitfield et al. | |
| 6,247,008 B1 | 6/2001 | Cambot et al. | |
| 6,353,814 B1 * | 3/2002 | Weng | 706/12 |
| 6,493,607 B1 | 12/2002 | Bourne et al. | |
| 6,604,094 B1 | 8/2003 | Harris | |
| 6,687,685 B1 | 2/2004 | Sadeghi et al. | |
| 6,862,497 B2 * | 3/2005 | Kemp et al. | 700/264 |
| 2002/0129015 A1 | 9/2002 | Caudill et al. | |
| 2003/0093514 A1 | 5/2003 | Valdes et al. | |

(Continued)

FOREIGN PATENT DOCUMENTS

WO   WO 02/057961 A2   7/2002

OTHER PUBLICATIONS

Markov Chain, Wilipedia, the free encyclopedia, [online] [Retrieved on Mar. 30, 2006] Retrieved from the Internet<URL: http://en.wikipedia.org/wiki/Markov_chain>.

(Continued)

*Primary Examiner*—Hosain Alam
*Assistant Examiner*—Ann J Chempakaseril
(74) *Attorney, Agent, or Firm*—Fenwick & West LLP; Mark Duell

(57) ABSTRACT

A system and a method are disclosed that provide plans for autonomous machines such as humanoid robots to perform indoor task. Human subjects contribute plans to a knowledge database. Information in the knowledge database is pre-processed to identify task steps and characterize them as action-object pairs, from which a plan database is created. A discriminative technique uses hierarchical agglomerative clustering to select an existing plan from the plan database. A generative technique formulates new plans from the plan database using first-order Markov chains, and may take into account information about the operational environment. Experimentation and evaluation by human subjects confirm the efficacy of both techniques.

14 Claims, 5 Drawing Sheets

U.S. PATENT DOCUMENTS

2004/0111408 A1    6/2004  Caudill et al.

OTHER PUBLICATIONS

Arroyo, A.A., "A Prototype Natural Language Processing System for Small Autonomous Agents," Machine Intelligence Laboratory, Department of Electrical and Computer Engineering, University of Florida, pp. 1-6.

Baumgartner, P. et al., "Automated Reasoning Support for SUMO/KIF," Max-Planck-Institute for Computer Science, Saarbrucken, Germany, Feb. 4, 2005, pp. 1-18.

Brill, Eric A Simple-Rule Based Part-of-Speech Tagger, Proceedings of ANLP-92, 34d Conference on Applied Natural Language Processing, Trento, IT 1992, pp. 1-4.

Gupta, Rakesh et al., "Common Sense Data Acquisition for Indoor Mobile Robots," Nineteenth National Conference on Artificial Intelligence (AAAI-04), Jul. 25-29, 2004, pp. 1-6.

Kalinichenko, L.A., "Rule-Based Concept Definitions Intended for Reconciliation of Semantic Conflicts in the Interoperable Information Systems," Institute for Problems of Informatics, Proceedings of the Second International Baltic Workshop on DB and IS, Jun. 1996, pp. 1-12.

Kurfess, F.J., "CPE/CSC 481: Knowledge-Based Systems," 2005-6, Retrieved from the Internet <URL:www.csc.calpoly.edu/~fkurfess/Courses/481/Slides/>.

Laskey, K.B., "Knowledge Representation and Inference for Multisource Fusion," Apr. 2002, Retrieved from the Internet<URL:www.msri.org/publications/In/hosted/nas/2002/laskey/1/banner/01.html>.

Matsuda, Y. et al., "Synthesis of Multiple Answer Evaluation Measures Using a Machine Learning Technique for a QA System," Proceedings of the NTCIR-5 Workshop Meeting, Dec. 6-9, 2005, 7 pages.

"Mixed-Initiative Activity Planning," NASA Ames Research Center, 2004, [online] [Retrieved on Nov. 21, 2006] Retrieved from the Internet<URL:http://ic.arc.nasa.gov/publications/pdf/Mixed_Initiative_Act.pdf>.

Russell, S. J., et al., Artificial Intelligence-A Modern Approach, Second Edition, Prentice Hall, Pearson Education, Inc., New Jersey 2003/1995, pp. 462-536.

Setiono, R. et al., "Automatic Knowledge Extraction from Survey Data: Learning M-of-N Constructs Using a Hybrid Approach," Journal of the Operational Research Society, 2005, pp. 3-14, vol. 56.

Soricut, R. et al., "Automatic Question Answering: Beyond the Factoid," [online] [Retrieved on Nov. 28, 2006] Retrieved from the Internet<URL:http://acl.ldc.upenn.edu.hlt-naacl2004/main/pdf/104_Paper.pdf>.

Stork, David G., "Open Mind Initiative," ICDAR99, Bangalore, India, pp. 1-28.

Zhang, W., "Representation of Assembly and Automatic Robot Planning by Petri Net," IEEE Transactions on Systems, Man, and Cybernetics, Mar./Apr. 1989, pp. 418-422, vol. 19, No. 2.

PCT International Search Report and Written Opinion, PCT International Patent Appl. No. PCT/US06/02204, Feb. 13, 2008, 5 Pages.

\* cited by examiner

500

| Technique | Average Score | Rank | Note |
|---|---|---|---|
| 1. Random selection from plan database | 267.63 | 5 | This is the worst |
| 2. Discriminative | 257.45 | 3 | |
| 3. Generative, local optimality, no tie resolution | 245.90 | 1 | This is the best |
| 4. Generative, global optimality, random tie resolution | 250.09 | 2 | |
| 5. Generative, global optimality, tie resolution according to shortest sequence | 266.00 | 4 | |

| Technique | $p$-value |
|---|---|
| 2 | 0.0838 |
| 3 | 0.0004 |
| 4 | 0.0036 |
| 5 | 0.7866 |

Fig. 6

BUILDING PLANS FOR HOUSEHOLD TASKS FROM DISTRIBUTED KNOWLEDGE

CROSS REFERENCE TO RELATED APPLICATIONS

This application claims priority under 35 USC § 119(e) to U.S. Provisional Patent Application No. 60/697,843, titled "Building Plans for Household Tasks from Distributed Knowledge," filed Jul. 8, 2005, which is hereby incorporated by reference herein in its entirety.

This application is related to U.S. patent application Ser. No. 11/378,063, entitled "Commonsense Reasoning About Task Instructions," filed on Mar. 16, 2006, which is incorporated by reference herein in its entirety.

This application is related to U.S. patent application Ser. No. 11/046,343, titled "Responding to Situations Using Knowledge Representation and Inference," filed Jan. 28, 2005, which is incorporated by reference herein in its entirety.

FIELD OF THE INVENTION

The present invention generally relates to the field of autonomous machines, and more specifically, to enabling mobile robots to perform tasks in constrained environments.

BACKGROUND OF THE INVENTION

Humanoid robots, for example, robots having human characteristics, represent a major step in applying autonomous machine technology toward assisting persons in the home or office. Potential applications encompass a myriad of daily activities, such as attending infants and responding to queries and calls for assistance. Indoor humanoid robots may be expected to perform common household chores, such as making coffee, washing clothes, and cleaning a spill. Additional applications may include assisting elderly and handicapped persons. Humanoid robots will be expected to perform such tasks so as to satisfy the perceived desires and requests of their users. Through visual and voice recognition techniques, robots may be able to recognize and greet their users by name. In addition, robots should be able to learn through human interaction and other methods. In order to meet these needs, such robots must possess the requisite knowledge.

In particular, to accomplish an indoor task, an autonomous system such as a humanoid robot needs a plan with steps. It is desirable that the robot be able to derive such a plan dynamically, that is, taking into consideration aspects of the actual indoor environment when the task is to be performed. It is also desirable to derive plans based on "common sense" knowledge. For example, steps for executing common household or office tasks could be collected from non-expert human volunteers using distributed capture techniques.

Human actions have been analyzed on a variety of levels. At the most basic level, execution of an action can be represented by a motor response schema of sensory motor mapping. A description of this can be found in R. A. Schmidt, A Schema Theory of Discrete Motor Skill Learning, *Psychological Review*, 82(4):225-260, 1975, which is incorporated herein by reference in its entirety. At the most abstract level, concepts such as scripts and Memory Organization Packets (MOP) have been proposed to represent the organization of well-learned activities such as going to a restaurant or visiting a doctor for surgery. A description of this can be found in R. C. Schank and R. Abelson, *Scripts, Plans, Goals and Understanding*, Lawrence Erlbaum Associates Ltd., Hove, UK, 1977, and in R. C. Schank, *Dynamic Memory: A Theory of Reminding and Learning in Computers and People*, Cambridge University Press, Cambridge, 1982, both of which are incorporated by reference herein in their entirety. When a MOP is activated, only one step is generally carried out at a time, but steps can sometimes be combined with other activities. For example, one can read while waiting at doctor's office.

Between these extremes lies a range of practical, well-learned activities like making breakfast, cleaning one's teeth, dressing and so on. At this mid-level, Cooper and Shallice presented a computational model for selection of steps for routine tasks based on competitive activation within a hierarchically organized network of action schemas. Their activation model for sequential step selection was based on the Contention Scheduling theory of Norman and Shallice. A description of this can be found in Richard Cooper and Tim Shallice, *Contention Scheduling and the Control of Routine Activities*, Cognitive NeuroPsychology, 17(4):297-338, 2000, and in D. Norman and T. Shallice, *Attention to Action: Willed and Automatic Control of Behavior*, pages 1-18, Plenum Press, New York, 1980, both of which are incorporated by reference herein in their entirety. The Cooper-Shallice model was demonstrated for the routine task of preparing coffee. Under normal functioning, the model was able to generate a sequence of simple actions (pick up spoon, dip spoon in sugar bowl, etc.) culminating in a drinkable cup of coffee.

In contrast, work in artificial intelligence (AI) planning falls under the category of goal-controlled exploratory behavior. Attempts are made to reach the goal using knowledge of different plans, and a successful sequence is selected. Such planning is important during execution of tasks. A description of this can be found in Daniel S. Weld, *Recent Advances in AI Planning*, AI Magazine, 20(2):93-123, Summer 1999, which is incorporated by reference herein in its entirety.

One conventional approach has utilized expert systems to encode the steps for accomplishing a task algorithmically. A key component was the capture of human expert knowledge using a laborious manual process. A description of this can be found in D. A. Waterman, *A Guide to Expert Systems*, Addison Weseley, 1986, which is hereby incorporated by reference in its entirety. A disadvantage of this approach is that not everything that humans learn is taught by experts. Most day-to-day activities, e.g., tying shoe laces, are learned by observations of and interaction with non-experts.

According to Rasmussen et al., human activity in such routine tasks is goal-oriented and controlled by a set of proven rules. The sequence of task steps is typically derived empirically, communicated from another's knowhow or a "cookbook" sequence. A description of this can be found in Jens Rasmussen, *Skills, Rules and Knowledge: Signals, Signs, and Symbols, and Other Distinctions in Human Performance Models*, IEEE Transactions on Systems, Man and Cybernetics, SMC-13(3):257-266, May/June 1983.

One source of common sense knowledge is the World-wide Web ("web"). For instance, websites such as eHow.com list the steps to perform activities. Intel Corporation developed a system called Probabilistic Activity Toolkit (PROACT) to build activity models. They automatically identified activities by observing the objects involved in the activity. They also found the relevance of various terms to a given activity from the web. For instance, the word "cup" is highly related to the activity making tea because "cup"

occurs frequently on web pages about making tea. A description of this can be found in Matthai Philipose, Kenneth P. Fishkin, Mike Perkowitz, Donald Patterson, and Dirk Haehnel, *The Probabilistic Activity Toolkit: Towards Enabling Activity-Aware Computer Interfaces*, Technical Report IRS-TR-03-013, Intel Research Laboratories, November 2003, and in Mike Perkowitz, Matthai Philipose, Kenneth Fishkin, and Donald J. Patterson, *Mining Models of Human Activities from the Web*, Proceedings of the 13th Conference on World Wide Web, pages 573-582, ACM Press, 2004, both of which are incorporated by reference herein in their entirety.

Using the web as an open information source for building plans for tasks is very attractive. However, the extracted knowledge exhibits high variance and "noise", e.g., extraneous or erroneous information, and documents may be prohibitively large. An alternative is a distributed information source such as the Open Mind Indoor Common Sense (OMICS) database. In compiling this database, volunteers are prompted with household tasks and asked to provide steps to accomplish them. A description of this can be found in R. Gupta and M. Kochenderfer, *Common Sense Data Acquisition for Indoor Mobile Robots*, Nineteenth National Conference on Artificial Intelligence (AAAI-04), Jul. 25-29 2004. However, even with this approach, semantic information must be extracted from the steps provided.

From the above, there is a need for a practical system and method for building plans from distributed knowledge for enabling autonomous machines such as humanoid robots to perform tasks in constrained environments such as indoor environments.

SUMMARY OF THE INVENTION

The present invention meets these needs with a method and apparatus for providing autonomous machines such as humanoid robots with plans for performing tasks in constrained environments, such as indoor environments. According to one aspect of the invention, plans for performing such tasks are extracted or generated automatically from a knowledge database. The knowledge in the database is contributed by human subjects using distributed knowledge capture techniques. The Worldwide Web ("Web") is optionally used as a distributed knowledge capture and transfer medium, and as such, collection from a great number of people may be practical. As a benefit, the knowledge base embodies "common sense," that is, the consensus of the contributing subjects.

The knowledge database comprises one or more tasks, each task comprising one or more plans, and each plan comprising a sequence of instructions. According to one embodiment, the present invention chooses the "best" plan from the plans in the knowledge database as the plan that represents the majority consensus. In this embodiment, hierarchical agglomerative clustering may be used to group similar plans and then merge similar groups into larger groups. This is referred to as the discriminative approach.

According to another embodiment, the present invention generates, i.e., derives, a new plan from the plans in the knowledge database. This is referred to as the generative approach. Each plan may be modeled as a first-order Markov chain, wherein each step depends on the previous one, with no hidden states. According to one embodiment of the present invention, the generated plan takes into consideration environmental constraints, such as whether a particular appliance, e.g., a coffeemaker, is present within the indoor environment. This enables a humanoid robot to generate optimum task plans in real time, based on the robot's perception or information of such constraints.

Pairs of actions and objects are extracted from the knowledge database to formulate task steps. For example, for the task "wash clothes," the action-object pair corresponding to one task step might be (collect, clothes). A subsequent step might be (move to, washing machine). Furthermore, relationships between actions and objects for a given tasks are derived from the knowledge database. For example, the conditional probability of collecting clothes given that clothes are present is derived. A particular task may comprise multiple, potentially hundreds, of plans, each consisting of a sequence of steps. A plan may comprise any number of steps, preferably five to seven.

According to one embodiment, the possible steps of the possible plans corresponding to a particular task are captured in a graph. The graph comprises nodes and links. The nodes represent action-object pairs, i.e., steps, and the links represent transitions between steps. A given node step may be common to multiple plans. The graph begins with a common "start" node, from which links connect to all possible first steps of the task. Associated with each link is a relative likelihood, or probability, of the corresponding transition, as determined from the knowledge database. This topology repeats for the successive nodes and links.

This graphical methodology advantageously provides an efficient basis for deriving or generating all possible plans corresponding to a task. The graphic model can be conveniently modified when plan updates become available. Plans may be determined from the graph based on a variety of strategies, such as local or global optimality. According to one embodiment, in the event of a tie between two candidate plans, the plan having the shortest sequence is chosen. According to another embodiment, environmental constraints are taken into account. For example, if it is known that the actual environment has an available washing machine, plans that utilize washing machines will be favored, as opposed to, say, plans that involve dry cleaning.

The features and advantages described in the specification are not all inclusive and, in particular, many additional features and advantages will be apparent to one of ordinary skill in the art in view of the following drawings, specification, and claims. Moreover, it should be noted that the language used in the specification has been principally select for readability and instructional purposes, and may not have been select to delinate or circunmscribe the intensive subject matter.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. 5 illustrates results of experimental evaluation of the present invention.

FIG. 6 illustrates p-values corresponding to experimental evaluation of the present invention.

DETAILED DESCRIPTION

Reference will now be made in detail to several embodiments of the present invention, examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
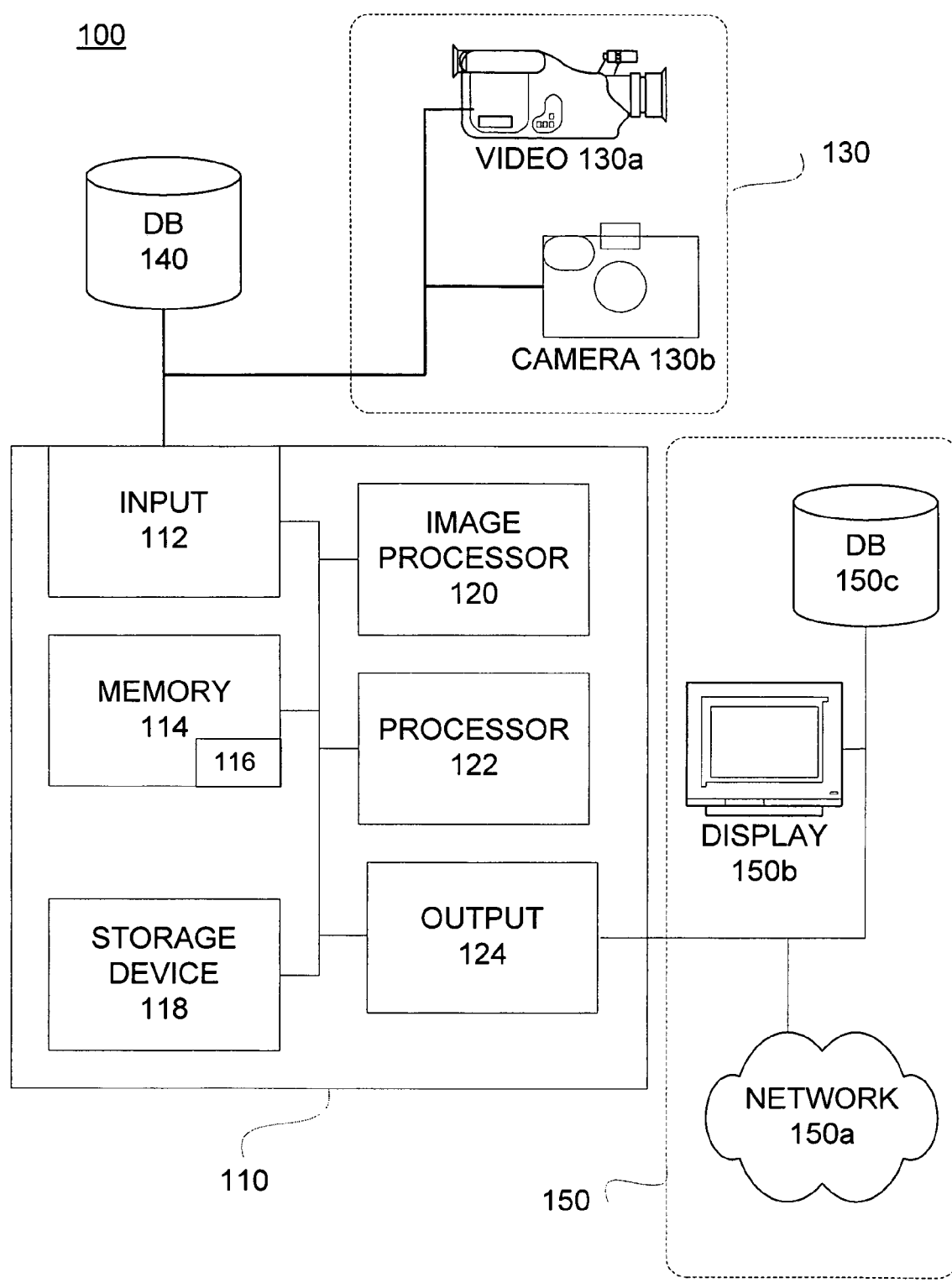
FIG. 1 illustrates a system according to one embodiment of the present invention.

Now referring to FIG. 1, a system according to one embodiment of the present invention is shown. Computer system 110 comprises an input module 112, a memory device 114, a storage device 118, a processor 122, and an output module 124. In an alternative embodiment, an image processor 120 can be part of the main processor 122 or a dedicated device to perceive situations as digital images captured in a preferred image format. Similarly, memory device 114 may be a standalone memory device, (e.g., a random access memory (RAM) chip, flash memory, or the like), or an on-chip memory with the processor 122 (e.g., cache memory). Storage device 118 may be any bulk storage device such as a hard disk, DVD-R/RW, CD-R/RW or RAM. Likewise, computer system 110 can be a stand-alone system, such as, a server, a personal computer, or the like. Alternatively, computer system 110 can be part of a larger system such as, for example, a robot having a vision system.

According to this embodiment, computer system 110 comprises an input module 112 to receive requisite information such as commonsense data from a database 140. Input module 112 may also receive digital images directly from an imaging device 130, for example, a digital camera 130a (e.g., robotic eyes), a video system 130b (e.g., closed circuit television), an image scanner, or the like. Alternatively, the input module 112 may be an interface to receive information from a network system, for example, a database, another vision system, Internet servers, or the like. The network interface may be a wired interface, such as, a USB, RS-232 serial port, Ethernet card, or the like, or may be a wireless interface module, such as, a wireless device configured to communicate using a wireless protocol, e.g., Bluetooth, WiFi, IEEE 802.11, or the like. An optional image processor 120 may be part of the processor 122 or a dedicated component of the system 110. The image processor 120 could be used to pre-process the digital images received through the input module 112 to convert the digital images to the preferred format on which the processor 122 operates.

Requisite information is stored in the memory device 114 to be processed by processor 122. Processor 122 applies a set of instructions that when executed perform one or more of the methods according to the present invention, e.g., generating a plan for executing a task as described herein. Memory device 114 may, e.g., include a module of instructions 116 for generating a plan for executing a task.

Processor 122 may output information through the output module 124 to an external device 150, e.g., a network element or server 150a, a display device 150b, a database 150c or the like. As with input module 112, output module 124 can be wired or wireless. Output module 124 may be a storage drive interface, (e.g., hard-drive or optical drive driver), a network interface device (e.g., an Ethernet interface card, wireless network card, or the like), or a display driver (e.g., a graphics card, or the like), or any other such device for outputting the information or responses determined.

Figure 2:
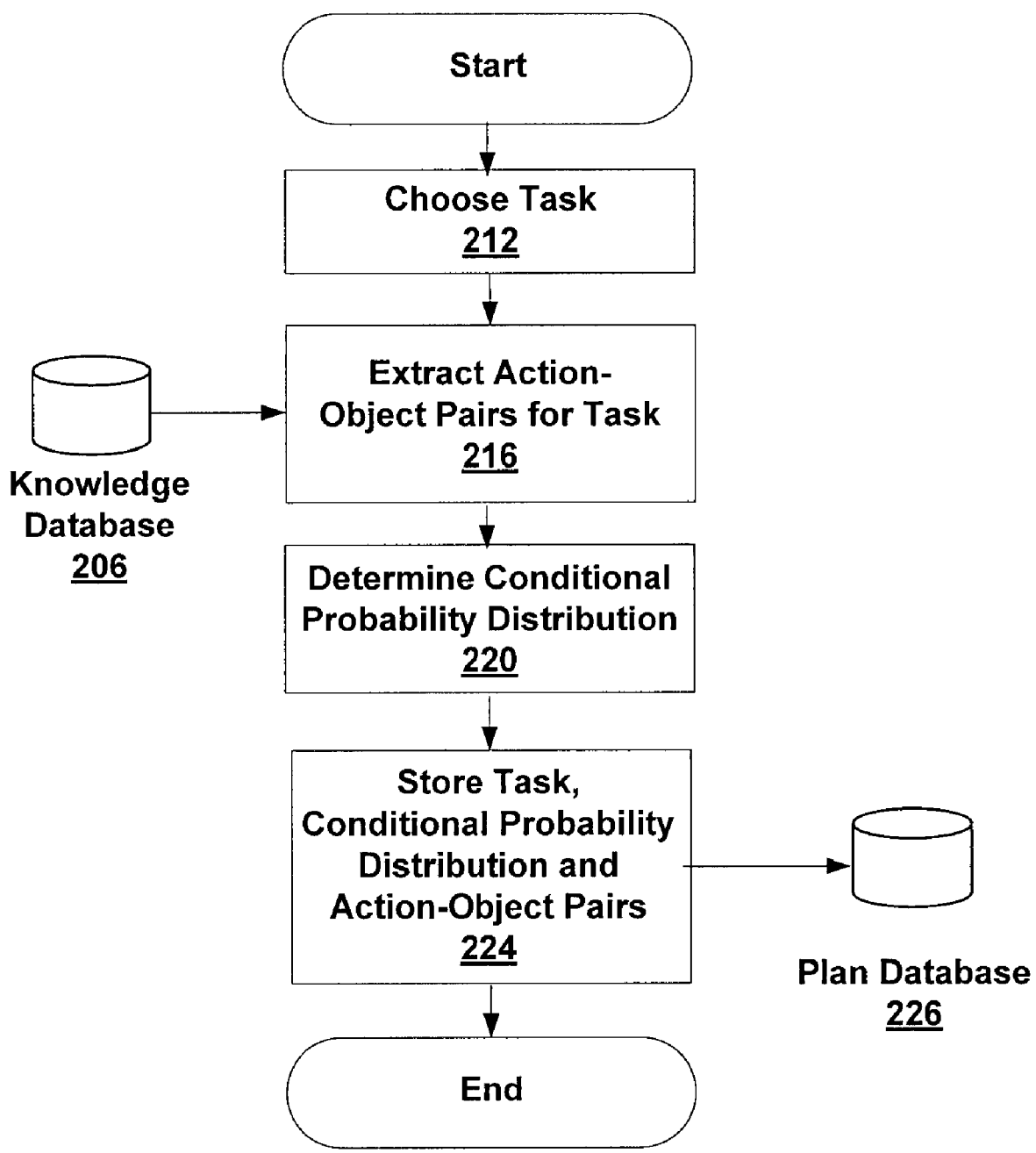
FIG. 2 illustrates a method of creating a task knowledge database, according to one embodiment of the present invention.

Referring now to FIG. 2, according to one embodiment of the present invention, a method 200 for creating a plan database is shown. Method 200 may be implemented, for example, by processor 122 executing an instruction module 116 as described above. Knowledge database 206 is first assembled offline, and may correspond, for example, to database 140 discussed above. For each defined task, humans contribute commonsense plans to database 206, each comprising a sequence of steps. Knowledge database 206 may include plans for hundreds of tasks such as making coffee, cleaning the floor or washing clothes. A sample plan from knowledge database 206 is shown below:

Task: wash clothes
Steps: collect clothes
   move to washing machine
   place clothes in washing machine
   add detergent to clothes
   close lid of washing machine
   start washing machine One embodiment of the present invention uses the set of plans for a given task within knowledge database 206 to build a plan database 226. Plan database 226 may reside, for example, in storage device 118 or database 150c as discussed above. A particular plan is later extracted or generated from plan database 226, as will be described. A task of interest is chosen 212. The information in Knowledge database 206 is first pre-processed by extracting 216 a set of action-object pairs corresponding to the task. According to one embodiment, task steps are first parsed with Brill's part-of-speech (POS) tagger. A description of this can be found in Eric Brill, *A Simple Rule-based Part-of-speech Tagger*, Proceedings of ANLP-92, 3rd Conference on Applied Natural Language Processing, pages 152-155, Trento, IT, 1992. This method identifies the first verb as the action. If the verb is followed by a proposition, the preposition is combined with the action verb. Finally, the first noun phrase is identified as the object of the action. The result of parsing the above sample plan is shown below:

Task: wash clothes
Action object pairs for steps:
   collect, clothes
   move to, washing machine
   lace, clothes
   add, detergent
   close, lid
   start, washing machine According to one embodiment, a conditional probability distribution is determined 220 for every object and corresponding action-object pair for a given task according to:

$$P(\text{action}|\text{object}) = \frac{f(\text{action, object})}{f(\text{object})} \quad (1)$$

where f (action, object) is the number of times action occurs with object and f (object) is the number of times object occurs within all of the plans corresponding to the given task. Once determined, the task definitions and corresponding action-object pairs and conditional probabilities are stored 224 in plan database 226.

A simplistic method of determining a plan makes a random selection from the set of plans in the plan database 226. This approach serves as a basis for comparison with more sophisticated approaches discussed below, and shall be referred to hereinafter as Technique 1.

Discriminative Approach

Figure 3:
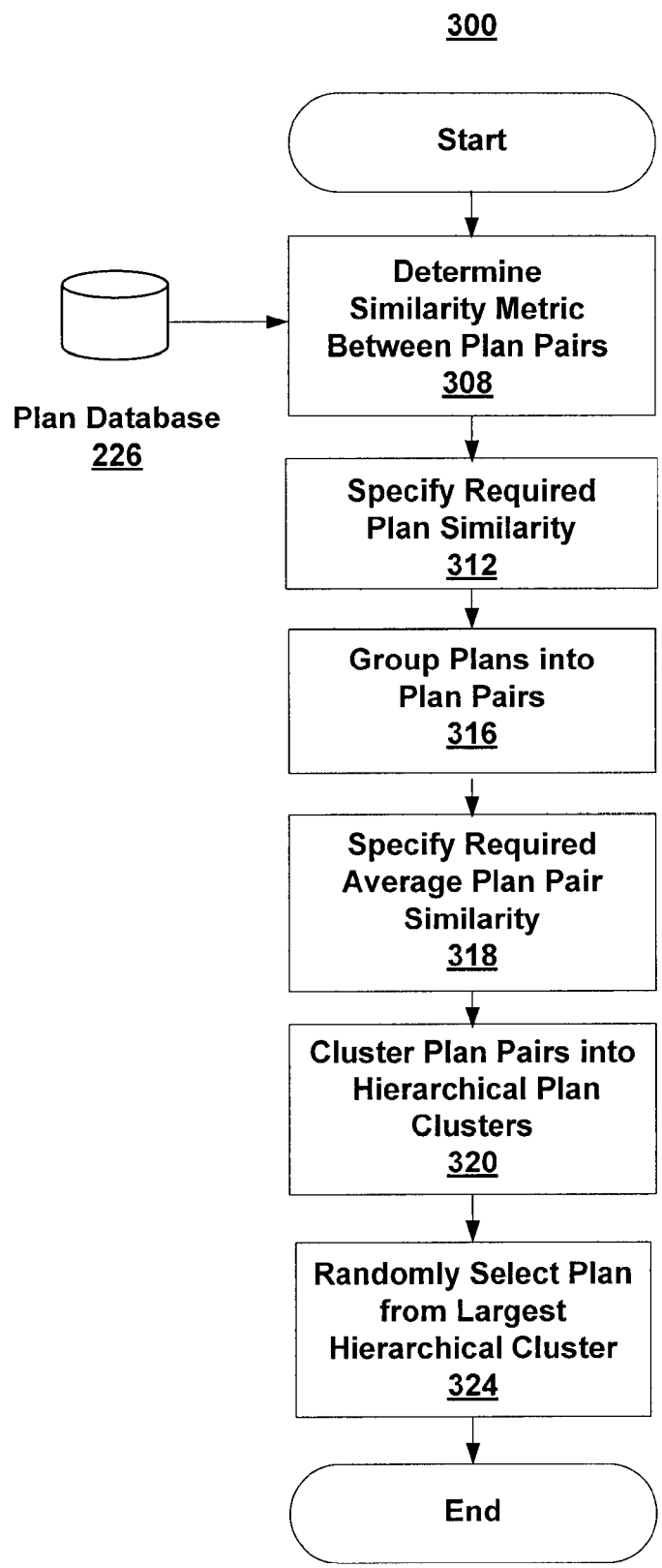
FIG. 3 illustrates a technique for building a plan for executing a task according to one embodiment of the present invention.

According to one embodiment of the present invention, the plan that represents the consensus of the human contributors is selected from plan database 226. This is referred to herein as the discriminative approach, as well as Technique 2. This technique is based on hierarchical agglomerative clustering method 300, as illustrated in FIG. 3. This comprises grouping similar plans present in plan database 226, and then clustering similar groups into larger clusters. A description of this can be found in Gelad Salton, ed., *Automatic Text Processing: The Transformation, Analysis, and Retrieval of Information by Computer*, Addison Wesley, 1989, which is incorporated by reference herein in its entirety. According to this embodiment, plan database 226 may reside in storage device 118 or may correspond to database 140, as discussed above. Method 300 may be implemented, for example, by processor 122 executing an instruction module 116 as described above Also, the results of clustering method 300 may be passed by output device 124 to network 150, and stored or forwarded as appropriate.

For each task in plan database 226, the similarity metric between pairs of plans $p_i$, and $p_j$ in plan database 226 is determined 308 as $$Sim(p_i, p_j) = \frac{len(LMS)}{len(p_i)len(p_j)} \quad (2)$$

where $len(p_i)$ is the length of, e.g., the number of steps in, plan $p_i$, and $len(LMS)$ is the length of the largest matching sequence, i.e., the largest number of common sequential steps in plans $p_i$ and $p_j$. Pairs of plans are grouped 316 by specifying 312 a minimum similarity according to equation (2). Such groups are in turn hierarchically clustered 320 based on the average group similarity used to obtain 318 a specified number of clusters. In other words, two levels of clustering are performed to obtain a desired number of hierarchical clusters.

It has been empirically found that such clusters correspond to distinct techniques or categories for accomplishing a task. For example, for the task of making coffee, the various clusters correspond to using a coffee maker, instant coffee, and an espresso machine. Since a majority of volunteers contributed plans for making coffee using a coffeemaker, that category was the largest cluster. Plans for indoor tasks commonly fall into five or fewer categories. Therefore, the average group similarity is preferably set to obtain five or fewer hierarchical clusters, i.e., categories of plans, for each task. After hierarchical cluster formation, a particular plan is randomly selected 324 from the hierarchical cluster that corresponds to the largest number of contributed plans.

Generative Approach

Figure 4:
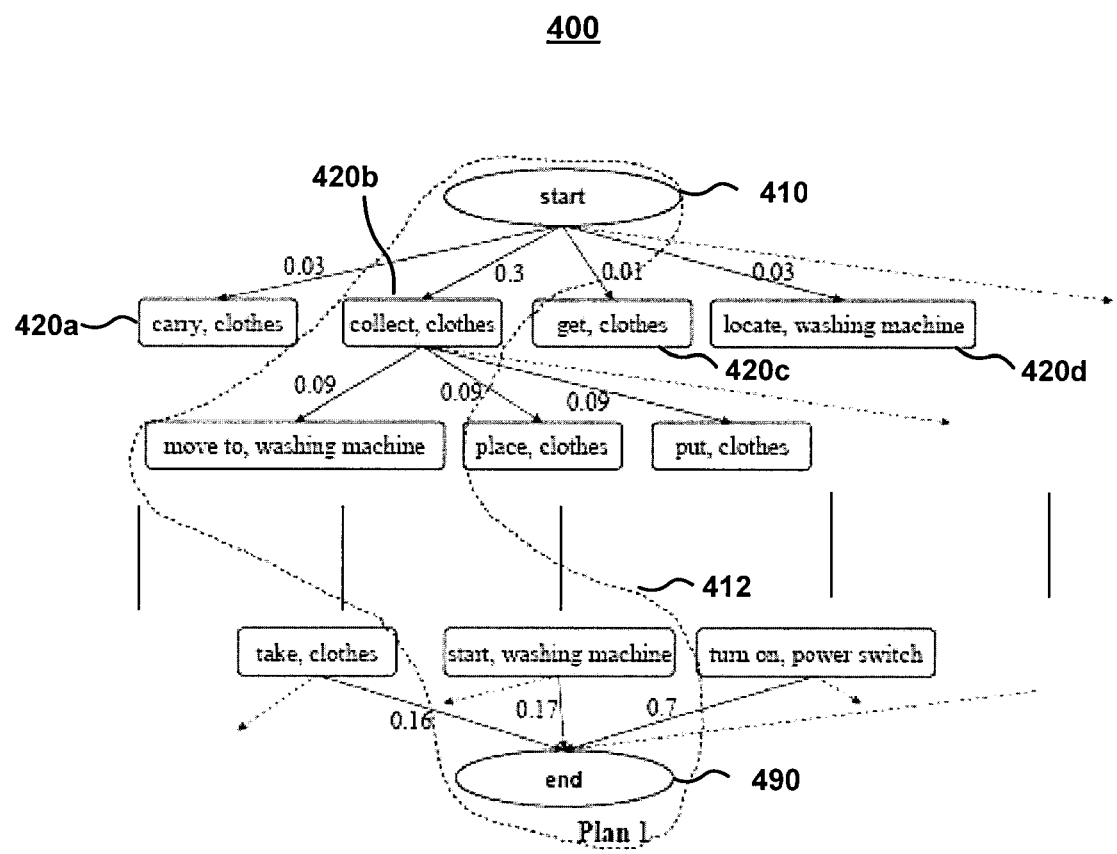
FIG. 4 illustrates a portion of a task model according to one embodiment of the present invention.

According to another embodiment of the present invention, a new plan may be generated from plan database 226. First, a task model is constructed for each task using first-order Markov chains. A Markov chain is a sequence of random variables. Application of Markov chains is useful due to the inherently sequential nature of the steps comprising a plan. According to one embodiment, each plan is modeled as a first-order Markov chain wherein each step depends on the previous step, with no hidden states. An exemplary task model 400 for the "task wash clothes" is illustrated in FIG. 4. Task model 400 comprises a graph wherein the nodes, also referred to as states or steps, represent task steps. The links of the graph represent transitions between successive steps. All plans for the task begin and end with a common start step 410 and a common end step 490. A plan is represented by a particular sequence of alternating steps and links. An exemplary plan for washing clothes is partially represented within the dashed boundary 412. Method 400 may be implemented, for example, by processor 122 executing an instruction module 116 as described above. The generated plan may be passed by output device 124 to network 150, and stored or forwarded as appropriate.

Steps 420a, 420b, 420c and 420d succeed start step 410 and comprise all possible first steps for all plans that can be derived from graph 400. For example, step 420b is the first step (after the start step) of the exemplary plan. Associated with each link is a transition probability, that is, a relative probability of the succeeding step given an occurrence of the preceding step. For example, if 100 plans are represented in task model 400, and "collect clothes" is the first step of 30 of the plans, the probability associated with step 420b is 0.3. The probabilities for the other links in task model 400 are similarly determined.

The complete task model thus compactly represents the possible steps for all plans for a given task. Furthermore, the task model serves as a basis for generating new plans, as will be described below. Advantageously, the task model can be easily expanded or otherwise updated by adding or changing steps and links and adjusting the probabilities as new plans for the task become available.

Generative Plans Based on Local Optimality

According to one embodiment of the present invention, a new plan for a task may be generated from the corresponding task model by choosing successive steps according to highest probability. For example, in task model 400, state 420b would be chosen among states 420a, 420b, 420c and 420d. Thus, the state at time t is determined by $$NextState(t) = \underset{s_i}{\arg\max}\, p(s_i | s_j) \quad (3)$$

where t is the time of the current step, $s_j$ is the state at time t-1, and $s_i$ are the possible successor states of $s_j$, that is, the states linked to $s_i$. Such a generative plan is said to have local optimality. This approach shall be referred to hereinafter as Technique 3.

Once a candidate step has been selected, incoming links to that step within the task model other than the link from the preceding state are removed. This is done to avoid forming undesired cycles, that is, loops through the graph. It should be noted that in general it is possible for the same step to occur more than once in a plan. For example, for the "task wash clothes," the step "open lid" can occur before putting the clothes into the washing machine and after washing is done. A sample generated plan for the task "wash clothes" according to this embodiment is given below, with each step described by the format step→transition probability→step:

```
start -> 0.36 -> get, clothes
get, clothes -> 0.3333 -> locate, machine
locate, machine -> 0.4285 -> move to, machine
move to, machine -> 0.2727 -> fetch, clothes
fetch, clothes -> 0.5 -> open, machine
open, machine -> 0.8 -> put, clothes
put, clothes -> 0.5294 -> add, detergent
add, detergent -> 0.5 -> close, machine
close, machine -> 0.2857 -> start, machine
start, machine -> 0.6666 -> end
```

Generative Plans Based on Global Optimality

According to another embodiment of the present invention, a plan may be generated from a task model by choosing each step in a manner that takes into consideration all preceding steps, not just the immediately preceding step. In this embodiment, the step at time t is determined using the equation $$NextState(t) = \operatorname*{argmax}_{i} p(s_i | s_1, s_2, \ldots, s_{i-1}) \quad (4)$$

where t is the time of the current step, $s_i$ are all the possible successor steps of $s_{i-1}$, and $s_1, s_2, \ldots, s_{i-1}$ are the steps that occurred through time t-1 and are linked in the task model. If multiple candidate plans give the largest probability, that is, if there is a tie, a selection may optionally be made randomly. This approach is referred to as Technique 4.

According to another embodiment of the present invention, Technique 4 is followed, except that in case of a tie, the plan having the fewest steps is chosen. This approach is referred to as Technique 5.

Generative Plans with Environmental Constraints

Techniques 1-5 may be implemented a priori, that is, without regard to the actual indoor environment in which the autonomous machine will operate. However, known aspects of the actual indoor environment may be taken into account in generating a plan. This promises a practicable plan. Such environmental information may, for example, be provided by the user of a robot. Alternately, environmental information may be determined by the robot via digital camera 130a, video system 130b, or other means. It may be advantageous to restrict or bias the generated plan to recommend the use of known available objects. This approach is referred to as Technique 6.

According to one embodiment of the invention, since task models are comprised of action-object pairs, the probabilities determined in Equation (1) may be utilized by assuming that the most likely action is the one that occurs most frequently with the object known to be present. More specifically, the most probable action to be associated with such an object is found according to $$\text{Most portable action} = \operatorname*{argmax}_{action} P(action | object) \quad (5)$$

Even though observed objects are associated with their most likely actions, such actions are not mandated within the plan. For example, the plan generation process may neglect such steps for consistency with other chosen steps.

A sample generative plan for the task "washing clothes" with the constraint that water, clothes and washing machine be used is given below:

```
Found restriction: "feed, water" with probability 0.2
Found restriction: "put, clothes" with probability 0.32
Found restriction: "start, washing machine" with probability 0.15
The plan:
start -> 0.36 -> get, clothes
get, clothes -> 1 -> put, clothes
put, clothes -> 1 -> feed, water
feed, water -> 1 -> feed, detergent
feed, detergent -> 1 -> set, timings
set, timings -> 1 -> start, washing machine
start, washing machine -> 0.6666 -> end
```

To bias the method toward choosing steps that fulfill the restrictions, the corresponding transition probabilities are set to 1.0. As a result, this plan differs from the one derived above without constraints.

In experiments, task plans for a set of 105 household tasks were determined and evaluated according to techniques 1-5 as described above. Technique 6 was not evaluated for reasons discussed below. At least 25 plans were present in the knowledge database for each task. All determined tasks used the same knowledge and preprocessing procedure. The five techniques evaluated are summarized below:

Technique 1 (Random approach): a plan was selected randomly from the plan database.

Technique 2 (Discriminative approach): a plan was selected from the largest cluster.

Technique 3 (Generative approach, local optimality): a plan was generated from the corresponding Task Model, with each step considered independently.

Technique 4 (Generative approach, global optimality, random tie resolution): a plan was generated from the Task Model by evaluating the probability of the sequence of steps as a whole. In case of a tie, a random selection was made from the best candidates.

Technique 5 (Generative approach, global optimality, deterministic tie resolution): a plan was generated from the Task Model by evaluating the probability of the whole sequence of steps and by choosing the plan having minimum length in case of a tie.

The following criteria were used to evaluate and compare the results:

1. Completeness: a plan for a task should include a complete set of steps. For example, a plan for cleaning the floor that applied water and soap but did not mop the floor afterward would be considered incomplete.

2. Correct sequence: the sequence of steps should be consistent with the steps themselves. For example, a plan that poured coffee from a carafe into a mug before adding water to the coffee-maker would merit a low rating.

3. Sensibility: the overall plan should make sense. For example, if a coffee-making plan used both a coffee-maker and instant coffee, it would merit a low rating.

4. Concise description: for a given number of objects, a plan having a more concise description is preferred. For example, for the task "making coffee," the step "add filter" is preferable to the sequence "find filters," "take one filter," "add filter."

Since the "goodness" of a plan cannot be evaluated objectively, human subjects evaluated the results. Ten subjects ranked each determined plan for each of the 105 tasks. Technique 6 was not evaluated in this manner, since the use of environmental constraints was considered difficult to evaluate. However, technique 6 is a special case of technique 3 and thus inherits the advantages of that technique. The worst possible score for a plan was 5 and the best possible score was 1. The ten scores each plan received were averaged. The 105 average scores for each technique were then added. The results are summarized in FIG. 5, from which the following observations may be made:

Technique 1 gives the worst performance; thus, reliance on the knowledge of just one person or source likely results in a poor plan.

Technique 2 is superior to Technique 1. Thus, a plan chosen randomly from the consensus cluster is better than a plan chosen completely at random.

Technique 3 offers the best performance. This technique is also attractive for other reasons. First, it considers steps as separate entities, rather than aspects of pre-existing plans (as with Techniques 1 and 2). Thus, the resultant plan is not limited to a pre-existing plan (as with Techniques 1 and 2). Second, this technique is able to remove some "noise," e.g., misspellings, mistakes, etc., and spurious data through learning. Third, it captures the consensus at the level of task steps and their sequencing.

Techniques 4 and 5 do not perform as well as technique 3. This may be due to the lack of the number of plans used to effectively perform inferencing on long sequences of steps.

To evaluate the confidence associated with the ranking in Table 1, a paired two-tailed t-test was performed. This test evaluates the level of confidence in the relative results of a pair of tests by determining whether the outcomes of the two tests result from the same probability distribution. If such is the case, then the results will be statistically meaningful, i.e., there will be high confidence in the evaluated relative performance of the two techniques. The p-values for each of Techniques 2-5 relative to Technique 1 are given in FIG. 6. For p-values less than 0.05, the confidence in the relative performance will be at least 95%. As shown in FIG. 6, the p-values for techniques 3 and 4 are less than 0.05. Thus, there is a confidence of at least 95% that techniques 3 and 4 perform better than technique 1. As described above, these tests ranked best and second best, respectively.

Advantages of the present invention include a system and method for providing plans for autonomous machines such as humanoid robots to perform indoor tasks. The plans are based on commonsense, that is, on the consensus of non-expert human volunteers. This is an appropriate basis for routine household and other indoor tasks. The plans may be determined a priori, that is, without knowledge of the actual operational environment. Alternately, plans may be optimized to take into account the availability of objects in the actual operational environment. The plans are easily modified when new variations become available.

Those of skill in the art will appreciate additional alternative designs for a system and method for providing plans for autonomous machines to perform indoor tasks. Thus, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

The invention claimed is:

1. A computer based method for a humanoid robot to identify steps to perform a task in a constrained environment, the method comprising:
   receiving data collected by a distributed capture technique, said data comprising one or more plans for the humanoid robot to perform a task;
   automatically extracting from said data a sequence of task steps for the humanoid robot to perform the task;
   storing said sequence of task steps in a computer-readable memory;
   extracting an action-object pair from said sequence of task steps, said action-object pair corresponding a task step of said sequence of task steps;
   determining a conditional probability distribution for said action-object pair, said conditional probability distribution to handle constraints of the environment and specifying a probability distribution to handle constraints of the environment and specifying a probability of occurrence of an action of said action-object pair given a relative frequency of occurrence of an object and a relative frequency of joint occurrence of said action-object pair; and
   storing said conditional probability distribution for said action-object pair in a computer-readable memory.

2. The method of claim 1, wherein the step of receiving data further comprises receiving data from multiple users or from multiple locations.

3. The method of claim 1, wherein said distributed capture technique comprises receiving a response to a query, the query specifying the task.

4. The method of claim 1, wherein the conditional probability distribution is determined for each action-object pair according to $$P(\text{action}|\text{object}) = \frac{f(\text{action, object})}{f(\text{object})},$$

wherein f(action, object) is relative frequency of joint occurrence of action and object, and f(object) is the relative frequency of occurrence of object.

5. The method of claim 1, further comprising:
   capturing a plurality of plan models comprising the task, said action-object pair and said conditional probability distribution for said action-object pair;
   determining a set of similarity metrics, each similarity metric indicating a degree of relatedness of each pair of said plan models;
   grouping pairs of said plan models whose similarity metrics exceed a first plan similarity into plan pairs;
   clustering said plan pairs into hierarchical plan clusters such that an average plan pair similarity within each hierarchical plan cluster exceeds a first average plan pair similarity; and
   making a selection of a plan model from one of said hierarchical plan clusters that corresponds to the greatest number of plan models.

6. The method of claim 5, wherein said similarity metrics are determined according to $$Sim(p_i, p_j) = \frac{len(LMS)}{len(p_i)len(p_j)}$$

wherein len(LMS) is the length of the longest matching sequence of said steps of said pair of plan models and len ($p_i$) is the length of plan $p_i$.

7. The method of claim 1, further comprising:

extracting a plurality of action-object pairs from said sequence of task steps, each action-object pair corresponding to a task step of said sequence of task steps; and synthesizing a task model from said plurality of action-object pairs, said task model comprising:

a plurality of nodes, said nodes comprising a start node, one or more task step nodes, and a stop node, each said task step node corresponding to an action-object pair, and a plurality of links, each link connecting a pair of nodes.

8. The method of claim 7, wherein the task model further comprises a plurality of transition probabilities, each transition probability indicating a likelihood of an associated task step given the occurrence of an associated preceding task step.

9. The method of claim 8, further comprising the step of generating a plan, the plan comprising a sequence of said task steps for the humanoid robot to perform the task, each task step corresponding to a task step node, the sequence of said task steps determined according to the equation $$NextState(t) = \underset{s_i}{\mathrm{argmax}}\, p(s_i | s_j),$$

wherein:

NextState(t) represents a task step to be executed at a time t, $s_j$ is a task step that occurs at time t-1, $s_i$ are candidate successor task steps of $s_j$, and $p(s_j | s_i)$ represents a probability of task step $s_j$ occurring given an occurrence of task step $s_i$.

10. The method of claim 8, wherein a transition probability is modified based on the presence of an object corresponding to a task step node in the indoor environment.

11. The method of claim 8, further comprising the step of generating a plan, the plan comprising a sequence of said task steps, each task step corresponding to a task step node, the sequence of said task steps determined according to the equation $$NextState(t) = \underset{s_i}{\mathrm{argmax}}\, p(s_i | s_1, s_2, \ldots, s_{i-1}),$$

wherein:

NextState(t) represents a task step to be executed at time t, $p(s_i | s_1, s_2, \ldots, s_{i-1})$ represents a probability of state $s_i$ occurring given occurrences of states $s_1, S_2, \ldots, s_{i-1}$, $s_i$ are candidate successor task steps of $S_j$, $S_1, S_2, \ldots S_{i-1}$ are task steps preceding task step $s_i$.

12. The method of claim 11, further comprising the step of randomly selecting a plan in the event of a plurality of best candidate choices.

13. The method of claim 11, further comprising the step of selecting a plan having a shortest length in the event of a plurality of best candidate choices.

14. A computer software program product embodied on a computer readable medium for performing the method of claim 1 when run on a computing device.

* * * * *